(12) United States Patent
Mikaelian

(10) Patent No.: US 7,718,557 B2
(45) Date of Patent: May 18, 2010

(54) COMPOSITE UPHOLSTERY FABRIC PANELS WITH ENLARGED GRAPHITE INTUMESCENT PARTICLES

(75) Inventor: Zareh Mikaelian, Greensboro, NC (US)

(73) Assignee: Precision Fabrics Group, Inc., Greensboro, NC (US)

( * ) Notice: Subject to any disclaimer, the term of this patent is extended or adjusted under 35 U.S.C. 154(b) by 0 days.

(21) Appl. No.: 12/540,040

(22) Filed: Aug. 12, 2009

(65) Prior Publication Data

US 2009/0305025 A1 Dec. 10, 2009

Related U.S. Application Data

(62) Division of application No. 11/431,384, filed on May 10, 2006.

(51) Int. Cl.
*B32B 27/04* (2006.01)

(52) U.S. Cl. ...................................... 442/136

(58) Field of Classification Search .................. 5/698; 428/364, 365, 402, 920, 921; 442/136, 138, 442/227, 294
See application file for complete search history.

(56) References Cited

U.S. PATENT DOCUMENTS

| | | | |
|---|---|---|---|
| 3,833,951 A | 9/1974 | Hurwitz | |
| 3,889,022 A | 6/1975 | Whittaker et al. | |
| RE29,630 E | 5/1978 | May | |
| 4,216,261 A | 8/1980 | Dias | |
| 4,806,185 A | 2/1989 | Porter et al. | |
| 4,824,709 A | 4/1989 | Tschirch | |
| 4,923,729 A | 5/1990 | Porter et al. | |
| 5,070,119 A | 12/1991 | Nugent, Jr. | |
| 5,645,926 A * | 7/1997 | Horrocks et al. | 442/234 |
| 5,830,319 A | 11/1998 | Landin | |
| 6,153,668 A | 11/2000 | Gestner et al. | |
| 6,265,082 B1 | 7/2001 | Dunham et al. | |
| 2004/0226100 A1 | 11/2004 | Small et al. | |
| 2005/0145139 A1 * | 7/2005 | Khan et al. | 106/437 |

OTHER PUBLICATIONS

Vandersall, H.L., "Intumescent Coating Systems, Their Development and Chemistry," *J. Fire & Flammability*, vol. 2 (Apr. 1971), pp. 97-141.

* cited by examiner

*Primary Examiner*—Arti Singh-Pandey
(74) *Attorney, Agent, or Firm*—Myers Bigel Sibley & Sajovec, P.A.

(57) ABSTRACT

Fabric layers and composite articles that incorporate graphite-containing coatings that do not stain are provided. A fabric layer for use as a flame and heat blocking component of an upholstered article includes intumescent graphite particles that are configured to swell and char in the presence of flame so as to form a barrier to flame, hot gases and heat for a predetermined period of time. The graphite particles have a size greater than about 150 microns which prevents the particles from being drawn to a surface of an upholstered article during sewing and quilting operations.

7 Claims, 3 Drawing Sheets

COMPOSITE UPHOLSTERY FABRIC PANELS WITH ENLARGED GRAPHITE INTUMESCENT PARTICLES

RELATED APPLICATION

This application is a divisional application of pending U.S. patent application Ser. No. 11/431,384 filed May 10, 2006, which is incorporated herein by reference in its entirety.

FIELD OF THE INVENTION

The present invention relates generally to textiles and, more particularly, to fire resistant textile products.

BACKGROUND OF THE INVENTION

Various textiles used in the clothing, furnishings and industrial fabrics industries are fire-unstable, i.e., they burn or melt or otherwise heat-degrade when in contact with flame or heat. For example, woven, knitted, and non-woven constructions of cotton, viscose, rayon, synthetics such as polyester, natural/synthetic blends and wool may burn or melt in the presence of flame or heat.

The application of flame retardant treatments to textiles, nonwovens, papers, and the like, is well known. Flame retardant fabrics may be treated in such a way that they do not ignite, or support combustion, or they may be treated to provide "flame blocking" properties. Flame blocking materials not only do not support combustion, but also can function to protect objects that are flammable or that can be damaged by fire.

Flame blocking materials can have many forms. For example, flame blocking materials may be composed of non-combustible materials like asbestos, glass, metal, or may be composed of organic materials like para-aramid, melamine, polybenzimidazole, or other materials that have resistance to flame and heat, or may be composed of combustible materials that are treated chemically to resist fire and heat. An intumescent material will tend to char, swell, and form a barrier to flame, hot gases, and conductive heat transfer. Exemplary intumescent materials include, but are not limited to, melamine, pentaerythritol, fluorocarbon, graphite, bentonite, clay, phosphated or borated melamine, ammonium polyphosphate polyols and the like.

Intumescent coatings are described in *Intumescent Coating Systems, Their Development and Chemistry* by H. L. Vandersall, J. Fire & Flammability, Vol. 2 (April 1971), pp. 97-140, which is incorporated herein by reference in its entirety. The application of an intumescent material to textiles is usually carried out by conventional techniques, such as knife coating, roll coating, spray coating, calendering, transfer coating or screen printing.

U.S. Pat. No. 5,645,926 to Horrocks et al. describes a flexible fire and heat resistant material comprising an intimate mixture of organic intumescent filler and organic fibres adapted to char intensely within the temperature range of 200° C. to 500° C.

U.S. Pat. No. 4,923,729 to Porter et al. describes a method for increasing heat dissipation from the smolder or open flame site of an upholstered article by interposing a fire barrier material between the outer upholstery fabric and the filler or padding materials. The fire barrier material is formed by coating a fibrous substance, such as glass fibers, carbon fibers, and the like with a latex containing a finely divided heat conductive metal.

U.S. Pat. No. 5,830,319 to Landin describes a flexible fire barrier felt and a method of producing the fire barrier felt. The felt includes: at least about 10 weight percent (wt-%) of an organic polymeric binder; at least about 5 wt-% of organic fibers having pendant hydroxyl groups (preferably cellulosic fibers); and at least about 10 wt-% of a heat absorbing compound; wherein the felt contains at least about 0.3 wt-% of phosphorus, as provided by a phosphorus-containing compound.

U.S. Pat. No. 5,070,119 to Nugent, Jr et al. describes an intumescent curable composition which contains as a resinous binder a flexible polyepoxide resin. The intumescent curable composition is usually in the form of a thick material such as a mastic and is spray applied to a substrate.

U.S. Pat. No. 6,153,668 to Gestner et al. describes a method of making a fire barrier material comprising the steps of (a) providing components comprising at least about 25 wt-% binder, at least about 10 wt-% intumescent compound, and at least about 5 wt-% organic fibers comprising an organic material having pendant hydroxyl groups, based on a total dry weight of the fire barrier material; (b) combining the components to form a mixture; (c) foaming the mixture; (d) placing the foamed mixture onto a substrate; and (e) drying the foamed mixture for a time sufficient to form the fire barrier material, wherein the fire barrier material has a density ranging from greater than zero to about 0.35 g/cm$^3$. Once the mixture has been formed into a foam-like material, it is placed or applied onto a substrate, for example, by casting, pouring, or spreading. Placing or applying the mixture onto a substrate can be accomplished by casting the mixture onto a substrate and then pressing it to a desired thickness by means of a platen press, or it can be poured or cast into a mold lined with a release liner.

U.S. Pat. No. 6,265,082 to Dunham et al. describes a fire retardant composition consisting of a cured film, wherein the film is formed from a film-forming composition comprising a curable resin and at least one fire retardant, the fire retardant being included in an amount from about 5 to about 95 percent by weight based on the weight of the cured film, and wherein, when the film is adhered to a flexible substrate, the film substantially does not alter the hand of the flexible substrate.

U.S. Pat. No. 4,806,185 to Porter et al. describes a method for increasing heat dissipation from the smolder or open flame site of an upholstered article. The upholstered article comprises an outer fabric that houses and contains filler materials such as padding. The method involves interposing a fire barrier material between the decorative outer upholstery fabric and the filler materials. The barrier material completely envelops the filler material and can be woven or nonwoven and is made of coated fibrous substances, such as glass fibers, carbon fibers, polyaramid, polybenzimidazole, polymetaphenylene diamine isophthalate, and combinations thereof. The coating consists of a latex of enhanced thermal conductivity containing a finely divided heat conductive metal such as aluminum, copper, nickel, and mixtures thereof, with the proviso that the outer upholstered fabric has a porosity rating of less than 10 cubic feet of air per minute per square foot, measured at a pressure of one-half inch of water. The amount of heat conductive metal can vary from about 4 to 20%, and preferably about 8 to 10% by weight of the coating composition. The fire barrier fabric can also function as an effective fire barrier with for example, bedspreads, quilts or mattress ticking, and the like. The outer face fabric and the fire barrier fabric can be attached sequentially to a cushion or furniture frame. Alternatively, a prelaminated fabric consisting of the face fabric can be adhesively laminated to the fire barrier fabric. The fire barrier fabric can also be sewn to an outer face fabric.

U.S. Pat. No. 4,824,709 to Tschirch describes a textile product having a textile material and a backcoating comprised of a polymer matrix and inorganic smoke suppressant and/or flame retardant intumescent particles. The backcoating may also contain an inorganic filler that further enhances the flame retardancy and low smoke properties of the textile product. The methods of forming the textile product include mixing the smoke suppressant and/or flame retardant intumescent particles with the backcoating prior to its application to the textile material or the simultaneous spreading of the particles on the textile material with the polymer backcoating in order to form a layer of the particles directly adjacent to the textile material.

U.S. Pat. No. 4,216,261 to Dias describes a process for imparting an intumescent, water repellent, fire retardant finish that is applied by conventional coating techniques to one side of a fabric. The treated material is then dried at temperatures in the range 222° F. to 260° F.

U.S. Pat. No. 3,889,022 to Whittaker et al. describes a flame-retardant composite article having a core of one or more combustible materials, at least partly covered by a combination of one or more flexible intumescent char-forming materials, and one or more textile fibrous layers.

Expandable graphite is a particularly effective intumescent material. Graphite to be used as an intumescent material is conventionally treated with an acid (e.g., sulfuric, nitric, acetic acid, etc.) which permeates the layers of the graphite structure and causes the graphite to become expandable and form a thick insulative layer of carbon char when exposed to flame. When a substrate, such as a nonwoven, knit, or woven fabric, is coated with a layer of material containing expandable graphite, the coating will expand and form a thick char when exposed to fire, heat, hot gases, or molten materials, and effectively block the progress of a flame. Unfortunately, when fabrics having graphite-containing coatings are processed into composite upholstery articles (e.g., panels for use in mattress construction) via sewing and/or quilting, the graphite tends to stain the surfaces of the composite articles.

FIGS. 1A-1B illustrate a conventional composite upholstery panel 10 having a ticking layer 12, a layer of resilient cushioning material 14, and a backing layer 16 with a coating 18 of material containing expandable graphite. The ticking layer 12, cushioning material 14 and backing layer 16 are quilted together in a pattern via thread 20, Graphite particles from the coating 18 work their way through the cushioning material 14 and the ticking layer 12 for example, via a quilting needle, and stain the ticking layer surface 12a adjacent to the quilting thread 20, as illustrated. The staining is indicated generally as 22.

Graphite staining is particularly troublesome when upholstery panels have white and other light-colored outer layers (e.g., ticking layers). Unfortunately, light-colored ticking layers and covers are preferred in many upholstery industries including the bedding industry. As such, graphite is typically not used as an intumescent material in the bedding industry.

However, because graphite is an effective intumescent material, it would be desirable to be able to utilize graphite in the various upholstery industries where white and other light-colored fabrics are utilized.

SUMMARY OF THE INVENTION

In view of the above, fabric layers and composite articles that incorporate graphite-containing coatings that do not stain are provided. According to an embodiment of the invention, a fabric layer for use as a flame and heat blocking component of an upholstered article includes intumescent graphite particles that are configured to swell and char in the presence of flame so as to form a barrier to flame, hot gases and heat for a predetermined period of time. The graphite particles have a size greater than about 150 microns which prevents the particles from being drawn to a surface of an upholstered article during sewing and quilting operations.

According to embodiments of the present invention, a composite upholstery panel includes a layer of ticking fabric, a layer of resilient cushioning material, and a layer of backing fabric having a coating of intumescent material disposed on a surface thereof. The coating includes expandable graphite particles greater than 150 microns in size and that resist adherence to needles and thread and passage thereof through the layer of cushioning material and ticking layer. The ticking layer, cushioning layer, and backing layer are quilted together with thread that forms spaced-apart patterns of stitches extending along the composite upholstery panel. The graphite particles do not stain the ticking layer and, when exposed to flame, char and swell to form a barrier to flame, hot gases, and heat for a predetermined period of time.

Possible uses of composite panels and fabrics according to embodiments of the present invention include, but are not limited to, fabrics, clothing, mattresses, upholstered or leather-covered furniture, and commercial/transportation seating (e.g., airplane seating, train seating, auditorium seating, etc.).

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1B:
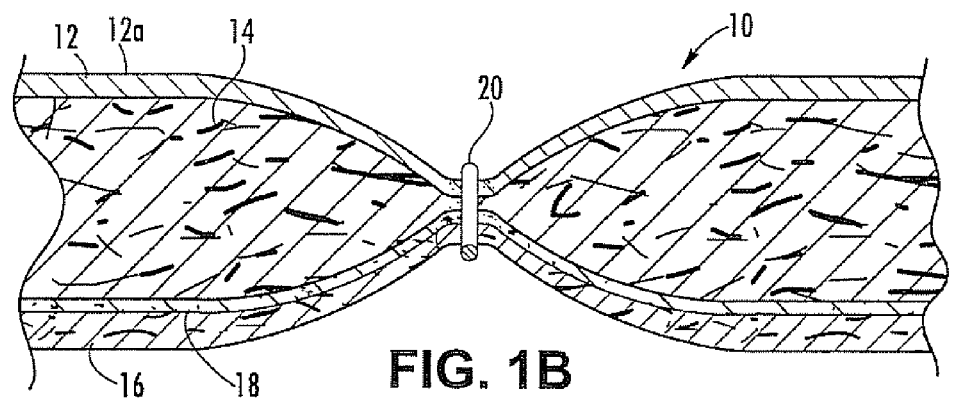
FIG. 1B is a cross-sectional view of the composite upholstery panel of FIG. 1A taken along lines 1B-1B.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise. All publications, patent applications, patents, and other references mentioned herein are incorporated herein by reference in their entireties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled to or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

Applicant has unexpectedly discovered that staining can be dramatically reduced or eliminated in composite articles wherein expandable graphite particles are incorporated as an intumescent material if the graphite particles are increased in size from conventional sizes. Applicant has discovered that staining does not occur if the particle size of the graphite is maintained above about 150 microns. Although not fully understood and not wishing to be bound by any particular theory. Applicant believes that graphite particles greater than about 150 microns (50 mesh) in size are not capable of adhering to needles and thread used in sewing and quilting operations and/or are unable to pass through fibrous layers of material. As such, graphite particles greater than about 150 microns are not transported to the surface of composite articles.

Figure 1A:
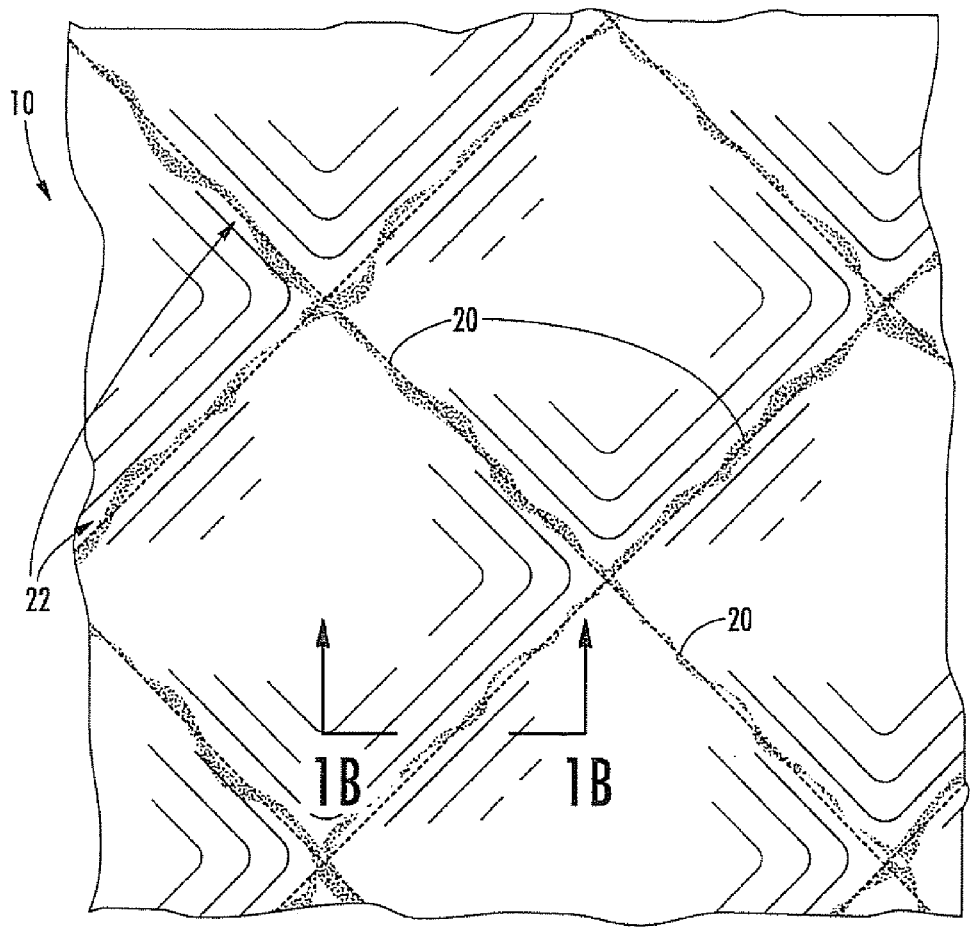
FIG. 1A is a plan view of a composite upholstery panel having a backing layer, cushioning layer and ticking layer quilted together, and wherein graphite particles from a coating on the backing layer have stained the surface of the ticking layer.
Figure 2:
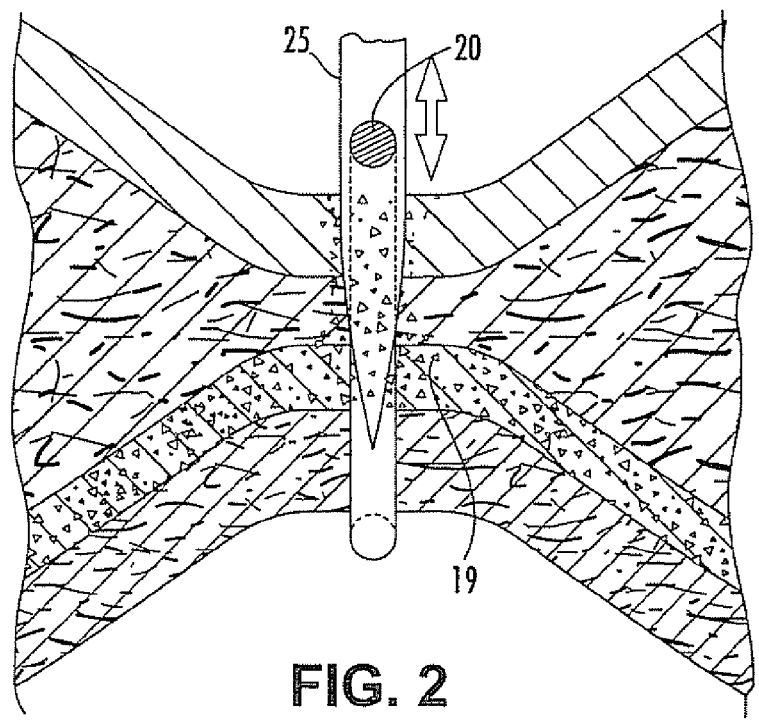
FIG. 2 is an enlarged cross sectional view of the composite upholstery panel of FIG. 1A which illustrates graphite particles being drawn up through the cushioning layer by the needle and thread and being deposited on and adjacent to the surface of the ticking layer.

FIG. 2 is an enlarged cross sectional view of the composite upholstery panel 10 of FIGS. 1A-1B with a quilting needle 25 passing therethrough to quilt the layers of the panel 10 together via thread 20. The graphite particles 19 in the coating layer 18 have a size less than about 150 microns which allows them to adhere to the needle 25 and thread 20 and to be drawn upwardly through the cushioning layer 14 and ticking layer 12 and deposited on and adjacent to the surface 12a of the ticking layer 12.

Figure 3B:
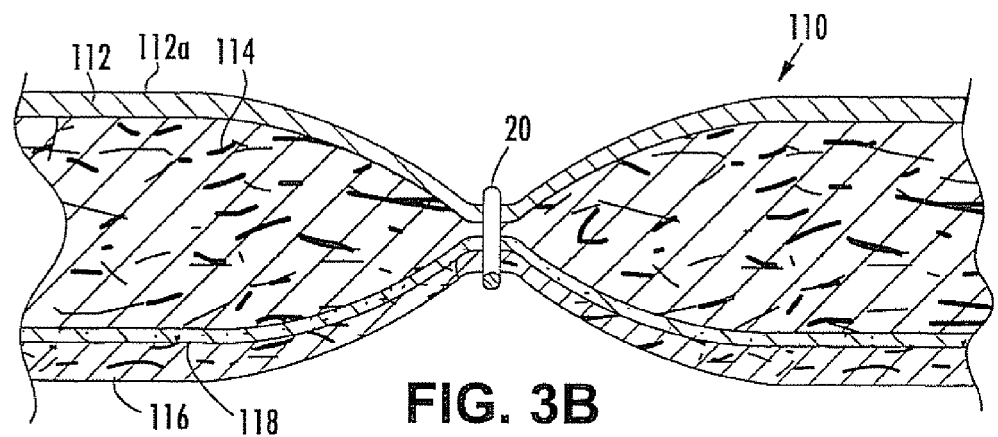
FIG. 3B is a cross-sectional view of the composite upholstery panel of FIG. 3A taken along lines 3B-3B.
Figure 3A:
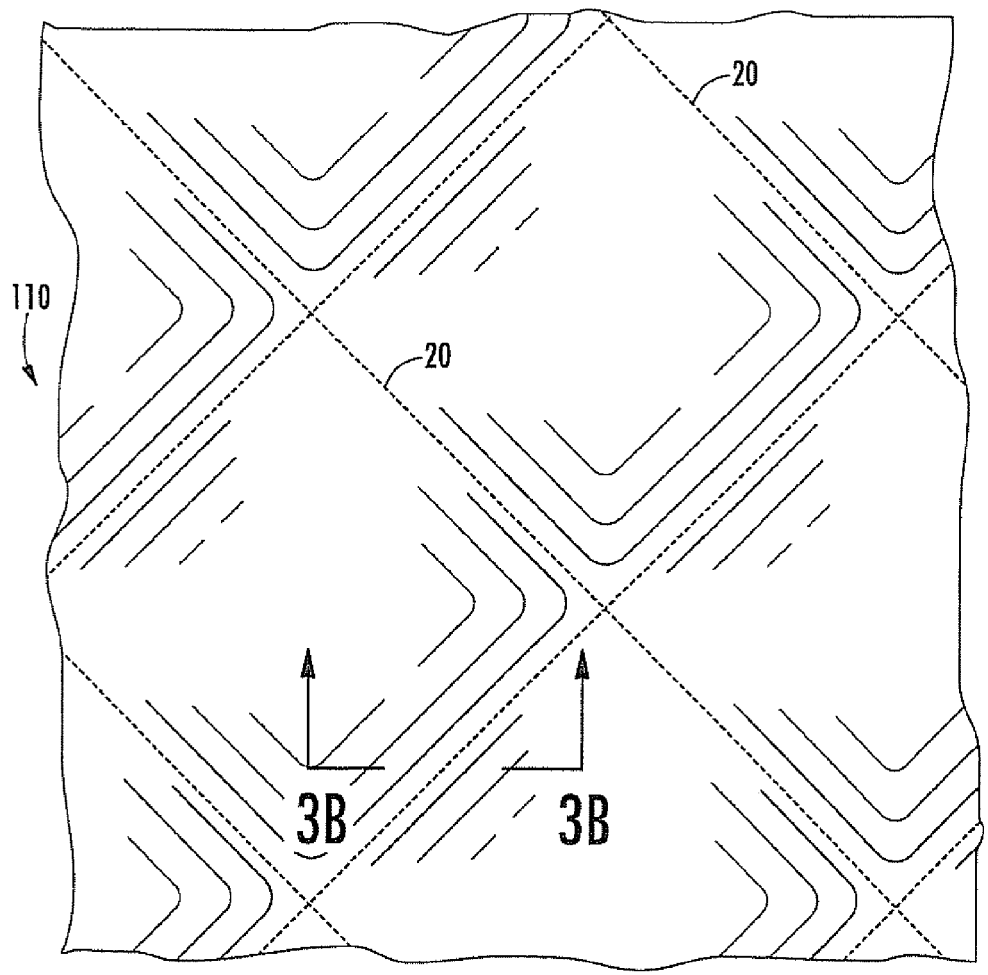
FIG. 3A is a plan view of a composite upholstery panel, according to some embodiments of the present invention, having a backing layer, cushioning layer and ticking layer quilted together, and wherein a coating including large, expandable graphite particles is disposed on the backing layer.

Referring to FIGS. 3A-3B, a composite upholstery panel 110, according to embodiments of the present invention, is illustrated. The composite upholstery panel 110 includes a layer of ticking fabric 112, a layer of resilient cushioning material 114, and a layer of backing fabric 116 having a coating 118 of intumescent material disposed on a surface thereof. The coating 118 includes expandable graphite particles having sizes that resist adherence to needles and thread and passage thereof through the layer of cushioning material 114 and ticking layer 112. The ticking layer 112, cushioning layer 114, and backing layer 116 are quilted together with thread that forms spaced-apart patterns of stitches extending along the composite upholstery panel 110, as illustrated.

According to some embodiments of the present invention, the graphite particles in the coating 118 have sizes greater than or equal to 150 microns. A preferable size range for the graphite particles is between 150 microns and 1000 microns with an average particle size generally between about 250 microns and 350 microns. Preferably, no more than about one percent (1%) of the total graphite particles in the coating 118 have a size less than 150 microns. When exposed to flame, the graphite particles in the coating 118 are configured to expand at least about fifty times an original volume and form a barrier to flame, hot gases, and heat for a predetermined period of time.

Exemplary graphite particles that may be used in coatings in accordance with some embodiments of the present invention include Nyacol Nyagraph 251, from Nyacol Corp. Ashland Mass., Signature Graphite 7800B from Superior Graphite Co. of Chicago Ill., and Graphguard 220-50, from Graphtech International, Lakewood Ohio. When preparing a coating containing graphite particles, it is important not to create small graphite particles (i.e., graphite particles smaller than 150 microns) when mixing, foaming, stirring, or coating the graphite containing mixtures. Graphite content within the coating may range from about 5% to about 50%, with 10% to 30% being a preferred range. At higher levels of graphite content, graphite particle size becomes even more important with regard to the potential for causing staining.

Figure 4:
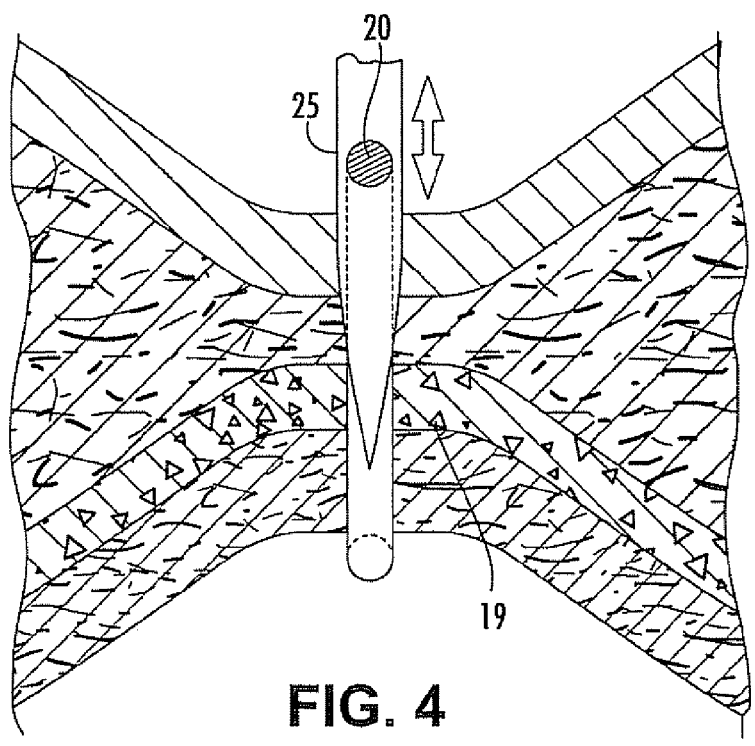
FIG. 4 is an enlarged cross sectional view of the composite upholstery panel of FIG. 3A which illustrates no graphite particles being drawn up through the cushioning layer via the quilting needle and thread.

FIG. 4 is an enlarged cross sectional view of the composite upholstery panel of FIGS. 3A-3B with a quilting needle 25 passing therethrough to quilt the layers of the panel 110 together via thread 20. Because average graphite particle size is greater than 150 microns, no graphite particles 19 are being pulled from the coating 118 via the quilting needle 25 and thread 20 and through the cushioning and ticking layers 114, 116.

According to embodiments of the present invention, the backing fabric 116 may be a fibrous layer of material, may be woven or nonwoven and may contain one or more types of fibers. For example, the backing layer 116 may be a nonwoven needlepunched fabric prepared from a blend of non-thermoplastic and thermoplastic fibers.

The coating 118 of intumescent material containing graphite particles may be applied to the backing layer 116 as a foam coating. Alternatively, the coating 118 may be applied as a paste coating. An exemplary foam coating process includes aerating the coating material using mechanical stirring while injecting air. The use of air as a diluent creates a mixture that has a higher viscosity than the precursor material and helps the coating maintain a foam structure during application to a substrate surface. The foam coating compound may then be applied using a knife or roller coater, reverse roll, slot coater, gravure coater, spraying, extrusion, dipping, or printing, each of which is well understood by those skilled in the art.

The composition of coating 118 may be compounded with binders and thickeners and the like to aid in the specific application of the coating. Additionally, flame retardant fillers such as alumina trihydrate, silicates, kaolin, gypsum and hydrated clay may be added.

If a foam coating process is utilized, the foam coating process can be designed to retain the foam structure when dried, or to have the foam structure rupture and disperse, leaving no foam structure in the dried coating. However, a coating with a retained foam structure may be preferred.

A technique for applying a foam coating containing expandable graphite, in accordance with embodiments of the present invention, is via a parabolic foam coating unit available from Gaston Systems, Inc., Stanley, North Carolina, and which is described in U.S. Pat. Nos. 6,395,088 and 6,508,882, both of which are incorporated herein by reference in their entireties.

The coating 118 may be dried using conventional means such as tentering, convection oven, infrared drying, flotation dryer or other common sheet or web drying equipment.

The layer of cushioning material 114 may be a foam material, a fibrous material or a combination of foam material and fibrous material.

EXAMPLE 1

An exemplary formulation for a coating containing expandable graphite is as follows:

| INGREDIENT | % (ACTIVE) |
| --- | --- |
| Water | 39.8 |
| Noveon MW 3141 (blend of Acrylic binder and clay) | 40.0 |
| Titanium dioxide dispersion | 3.0 |
| Ammonium lauryl sulfate | 0.1 |
| Nyacol Nyagraph 251 | 17.0 |
| Acrysol TT-615 thickener | 0.1 |

This mixture is prepared at a viscosity of 3000-7000 cps, and then foamed to a blow ratio of about 2 parts air to 1 part mixture. The resulting viscosity is 10,000-15,000 cps. This foam was coated on a 3.5 ounce/sq. yd needlepunched nonwoven that was composed of 90% viscose, and 10% para-aramid fiber. The chemical add on is 6.64 ounces/sq yard wet, or 4.0 ounces/sq yard dry. This coated fabric is soft, has excellent flame blocking properties, and does not cause marking when quilted or stitched.

EXAMPLE 2

If the same compound and coated fabric of Example 1 is prepared using Superior 7800 graphite, then the same soft, highly flame resistant compound is produced but since this graphite has 3.15% small particle graphite with sizes down to 45 microns or less, then the coated fabric will stain the stitching thread, the needles, and small particles will be extracted from the coating and deposited on the surface, which is unacceptable.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A composite upholstery panel, comprising:
a layer of ticking fabric;
a layer of resilient cushioning material; and
a layer of backing fabric comprising a coating of flame blocking material disposed on a surface thereof, wherein the coating comprises intumescent graphite particles having a size that prevents the graphite particles from being drawn through the cushioning material and ticking fabric and to a surface of the ticking fabric during sewing and quilting operations, wherein the intumescent graphite particles swell and char in the presence of a flame so as to form a barrier to flame, hot gases, and heat for a predetermined period of time; and
wherein the ticking fabric, cushioning material, flame blocking material, and backing fabric are quilted together with thread that forms spaced-apart patterns of stitches extending along the composite upholstery panel.

2. The panel of claim 1, wherein the graphite particles have a size greater than or equal to 150 microns.

3. The panel of claim 1, wherein the graphite particles have an average size of from 250 to 350 microns, and wherein less than one percent (1%) of the graphite particles have a size less than 150 microns 4. The panel of claim 1, wherein the coating comprises a polymeric binder and acid-treated expandable graphite particles, and wherein the graphite particles have sizes in the range from 150 microns to 1000 microns.

5. The panel of claim 1, wherein the graphite particles are acid-treated and are configured to expand at least about fifty times an original volume when exposed to flame.

6. The panel of claim 1, wherein the cushioning material comprises foam.

7. The panel of claim 1, wherein the cushioning material comprises a fibrous layer of material.

* * * * *